E. P. LINDAHL.
COATING APPARATUS AND METHOD OF COATING.
APPLICATION FILED JUNE 4, 1917.
1,338,782.
Patented May 4, 1920.
9 SHEETS—SHEET 6.
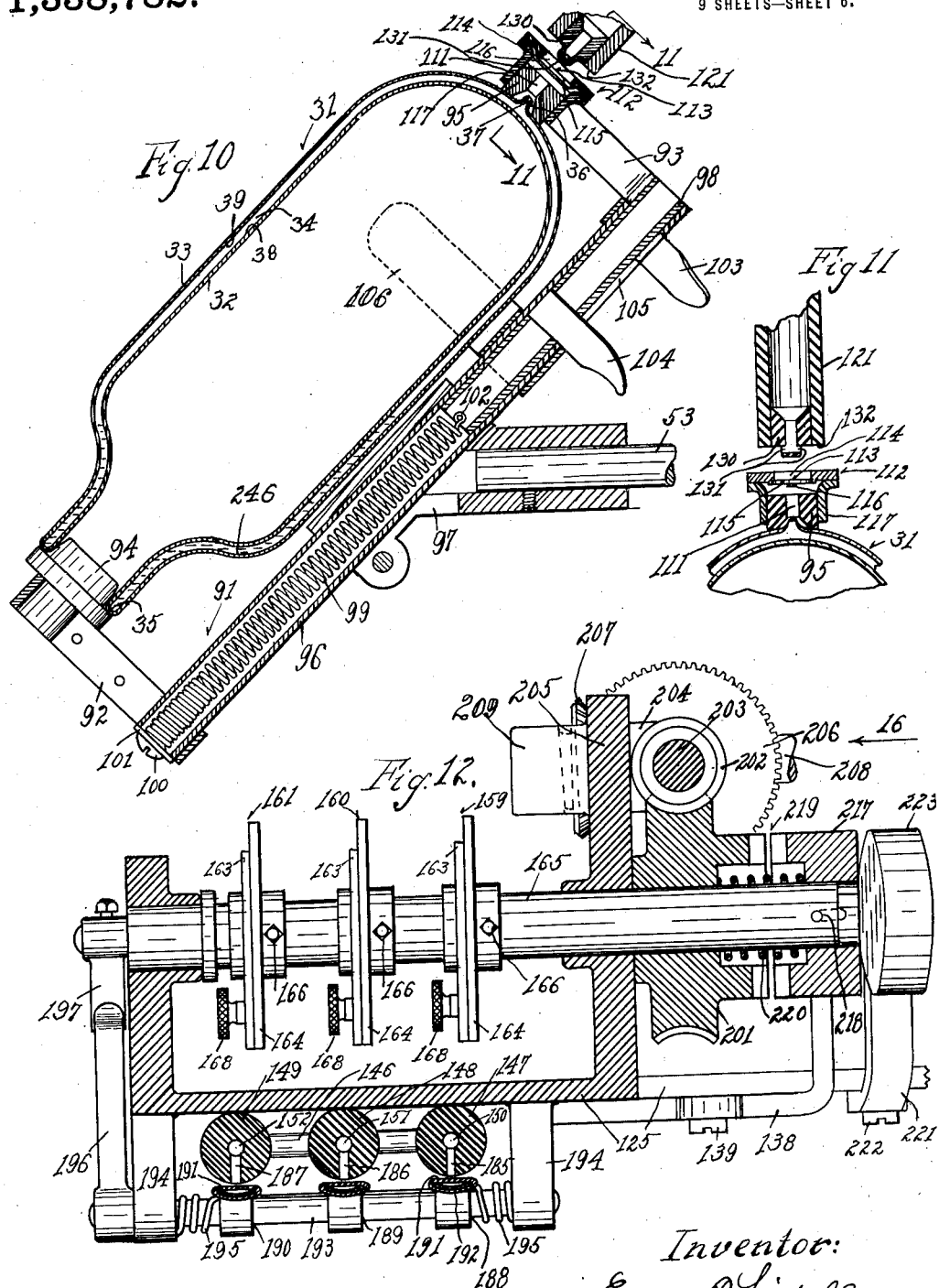

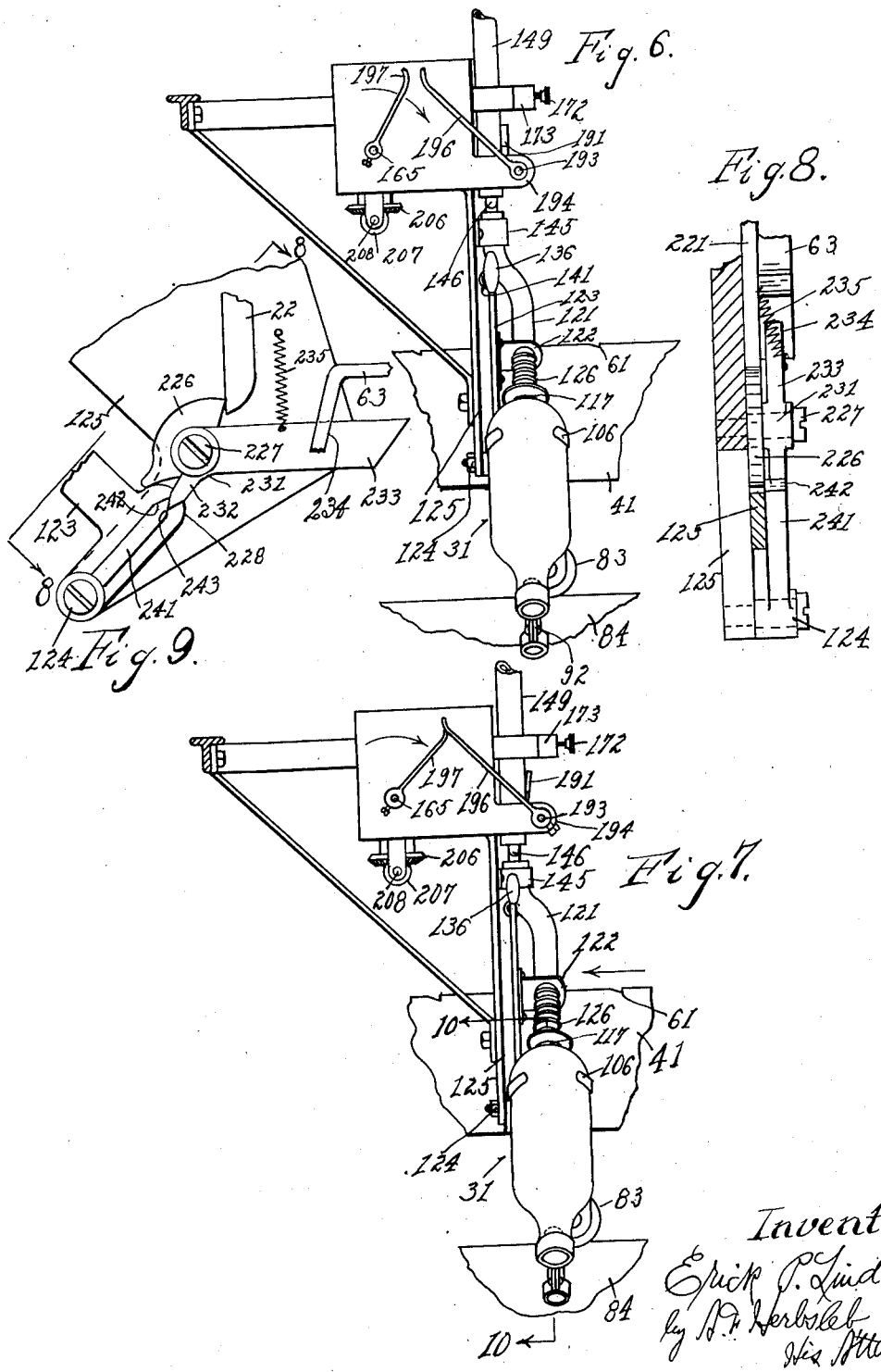

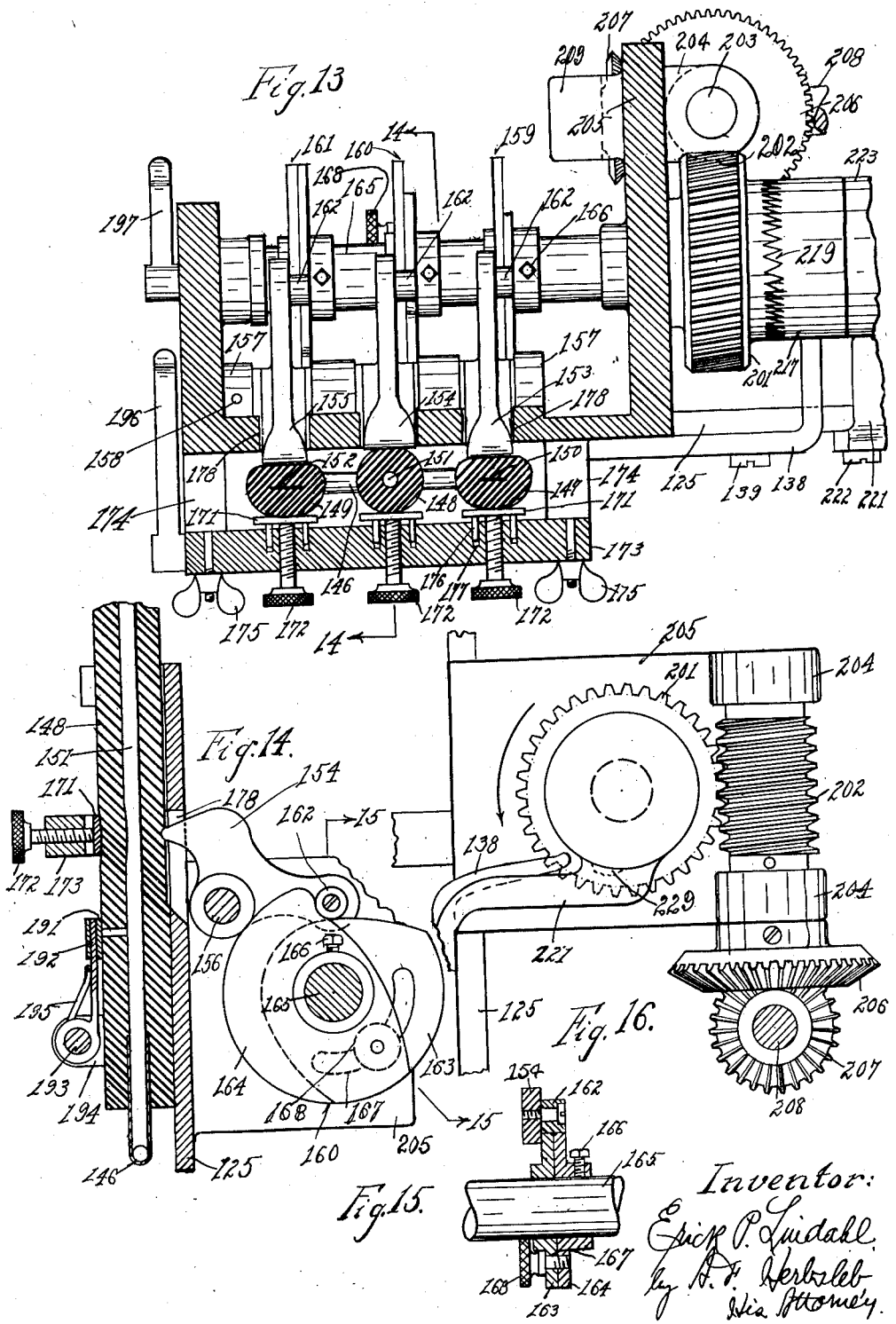

E. P. LINDAHL.
COATING APPARATUS AND METHOD OF COATING.
APPLICATION FILED JUNE 4, 1917.
1,338,782.
Patented May 4, 1920.
9 SHEETS—SHEET 8.
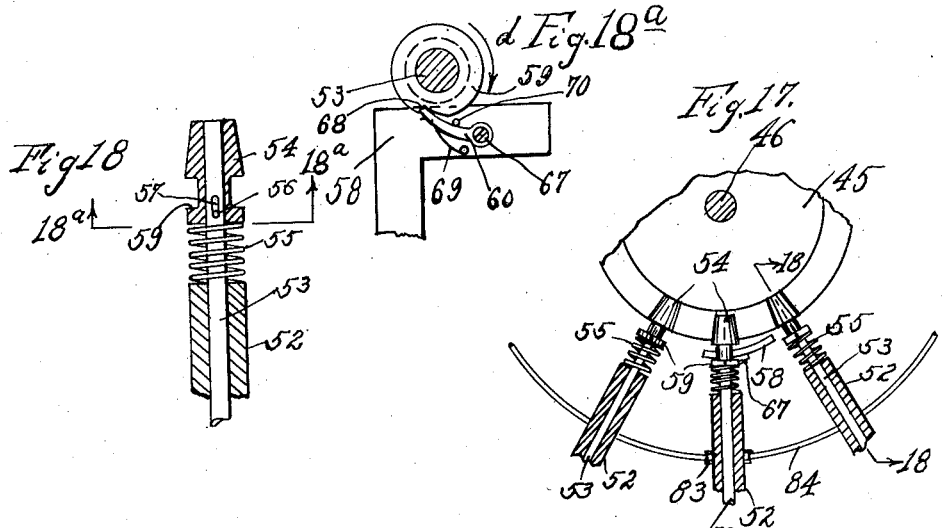
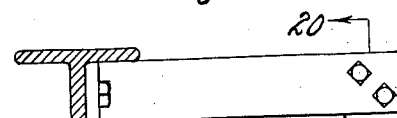
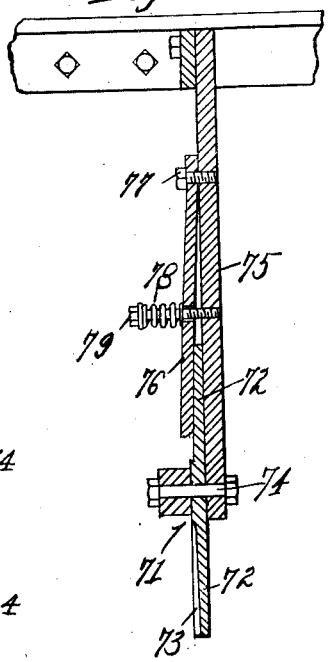
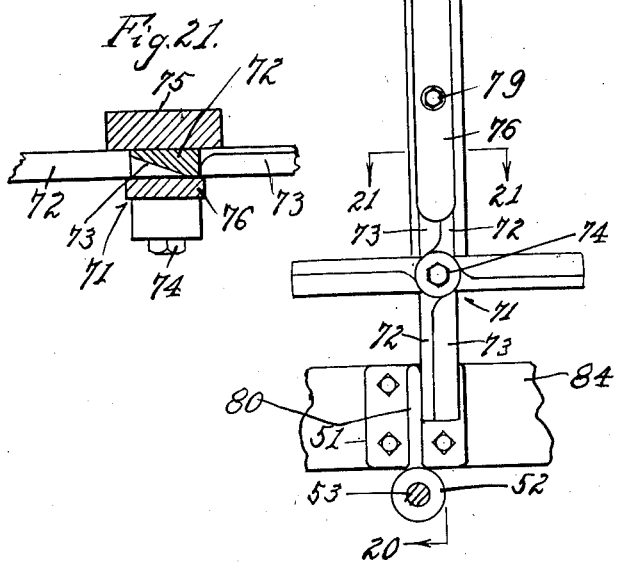

E. P. LINDAHL.
COATING APPARATUS AND METHOD OF COATING.
APPLICATION FILED JUNE 4, 1917.
1,338,782.
Patented May 4, 1920.
9 SHEETS—SHEET 9.
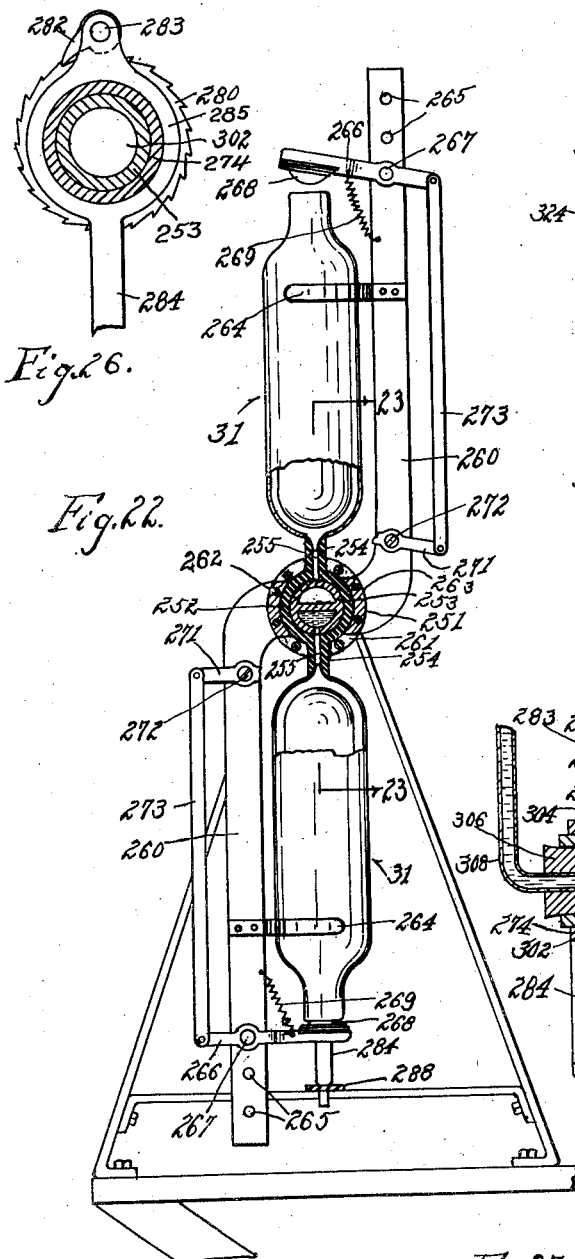
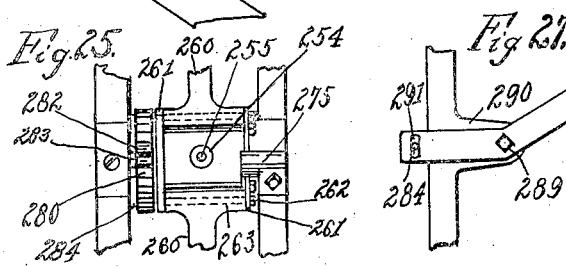
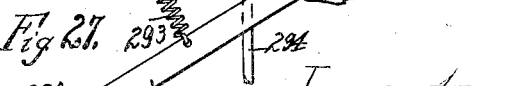

UNITED STATES PATENT OFFICE.

ERICK P. LINDAHL, OF PLEASANT RIDGE, OHIO, ASSIGNOR TO THE ICY-HOT BOTTLE COMPANY, OF CINCINNATI, OHIO, A CORPORATION OF WEST VIRGINIA.

COATING APPARATUS AND METHOD OF COATING.

1,338,782.      Specification of Letters Patent.      Patented May 4, 1920.

Application filed June 4, 1917. Serial No. 172,653.

*To all whom it may concern:*

Be it known that I, ERICK P. LINDAHL, a citizen of the United States, residing at Pleasant Ridge, in the county of Hamilton and State of Ohio, have invented certain new and useful Improvements in Coating Apparatus and Methods of Coating, of which the following is a specification.

It is the object of my invention to provide a new and improved coating apparatus and method of coating, employable, for example, in providing the inner surface of the wall about the space intended to form the vacuum insulated space of a vacuum insulated vessel with a suitable coating, exemplified as a mirror or silver coating, for aiding in heat insulation.

I shall show and describe my invention in connection with such use as an exemplification, the vessel operated on being exemplified as a usual vacuum insulated bottle.

It is the object of my invention to provide new and useful means and methods for coating the wall to be coated with a uniform coating and manipulating the vessel during the coating action; for insuring a uniform coating throughout; for introducing the coating material into the space, the inner surface of the wall of which is to be coated; for subjecting the vessel to heat during the coating operation; for removing the surplus coating material and refuse; and for rinsing the coated surfaces, and for drying the same.

The invention will be further readily understood from the following description and claims, and from the drawings, in which latter:

Fig. 6 is a front elevation of the same, showing the same in charging relation.

Fig. 7 is a front elevation of the same, showing the same in released relation.

Fig. 8 is a sectional detail of the tripping mechanism taken on the line 8—8 of Fig. 9.

Fig. 9 is a side elevation of the same.

Fig. 10 is an axial section of the bottle holding means shown in connection with the charging mouth of the charging mechanism, taken on the line 10—10 of Fig. 7.

Fig. 11 is a sectional detail of the same, taken on the line 11—11 of Fig. 10.

Fig. 12 is a horizontal section of a detail of the charging mechanism taken on the line 12—12 of Fig. 5.

Fig. 13 is a horizontal section of the same taken on the line 13—13 of Fig. 4.

Fig. 14 is a detail of the same taken on the line 14—14 of Fig. 13.

Fig. 15 is a sectional detail of the same taken on the line 15—15 of Fig. 14.

Fig. 16 is an inside side elevation of the driving means for the charging mechanism, taken in the direction of the line 16 of Fig. 12.

Fig. 17 is a plan view detail, partly in horizontal section on the line 17—17 of Fig. 2, showing the means for releasing the driving connection of the bottle-support being charged.

Fig. 18 is a vertical sectional detail of the same, taken on the line 18—18 of Fig. 17.

Fig. 18ª is a section on line 18ª—18ª of Fig. 18.

Figure 3:
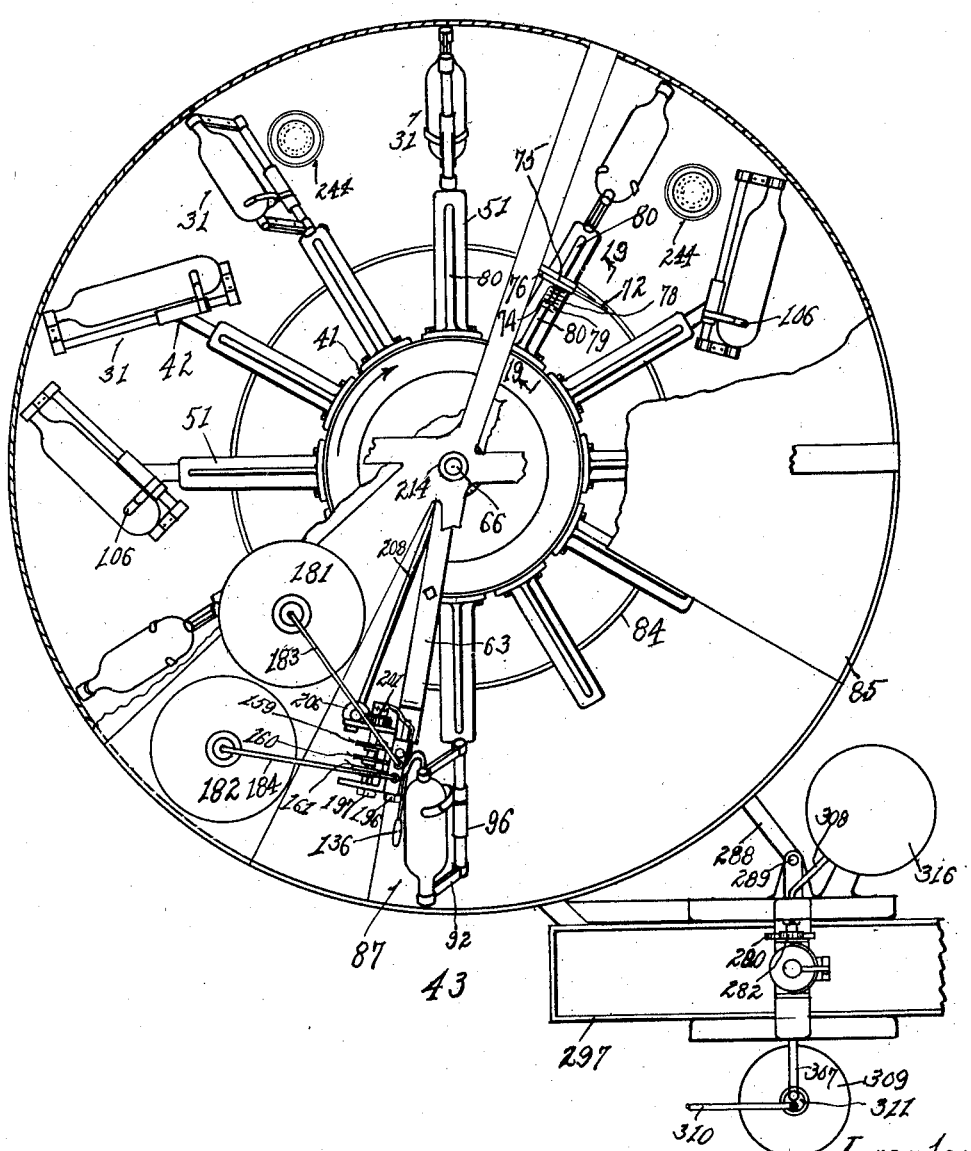
Fig. 3 is a plan view of the same.

Fig. 19 is a detail in side elevation, partly in section on the line 19—19 of Fig. 3, showing the means for braking the rotary bottle-support carrier.

Fig. 20 is a detail of the same in section on the line 20—20 of Fig. 19.

Fig. 21 is a sectional detail of the same on the line 21—21 of Fig. 19.

Fig. 22 is an enlarged detail in side elevation, of the rinsing means, with the tank removed, and showing the valve in central vertical section on the line 22—22 of Fig. 23.

Fig. 23 is an axial section of the valve, taken on the line 23—23 of Fig. 22.

Fig. 24 is a cross-sectional detail of the valve, taken on the line 24—24 of Fig. 23.

Fig. 25 is a plan view detail of the rinsing means.

Fig. 26 is a detail of the operating means for the rinsing valve, taken on the line 26—26 of Fig. 23.

Figure 2:
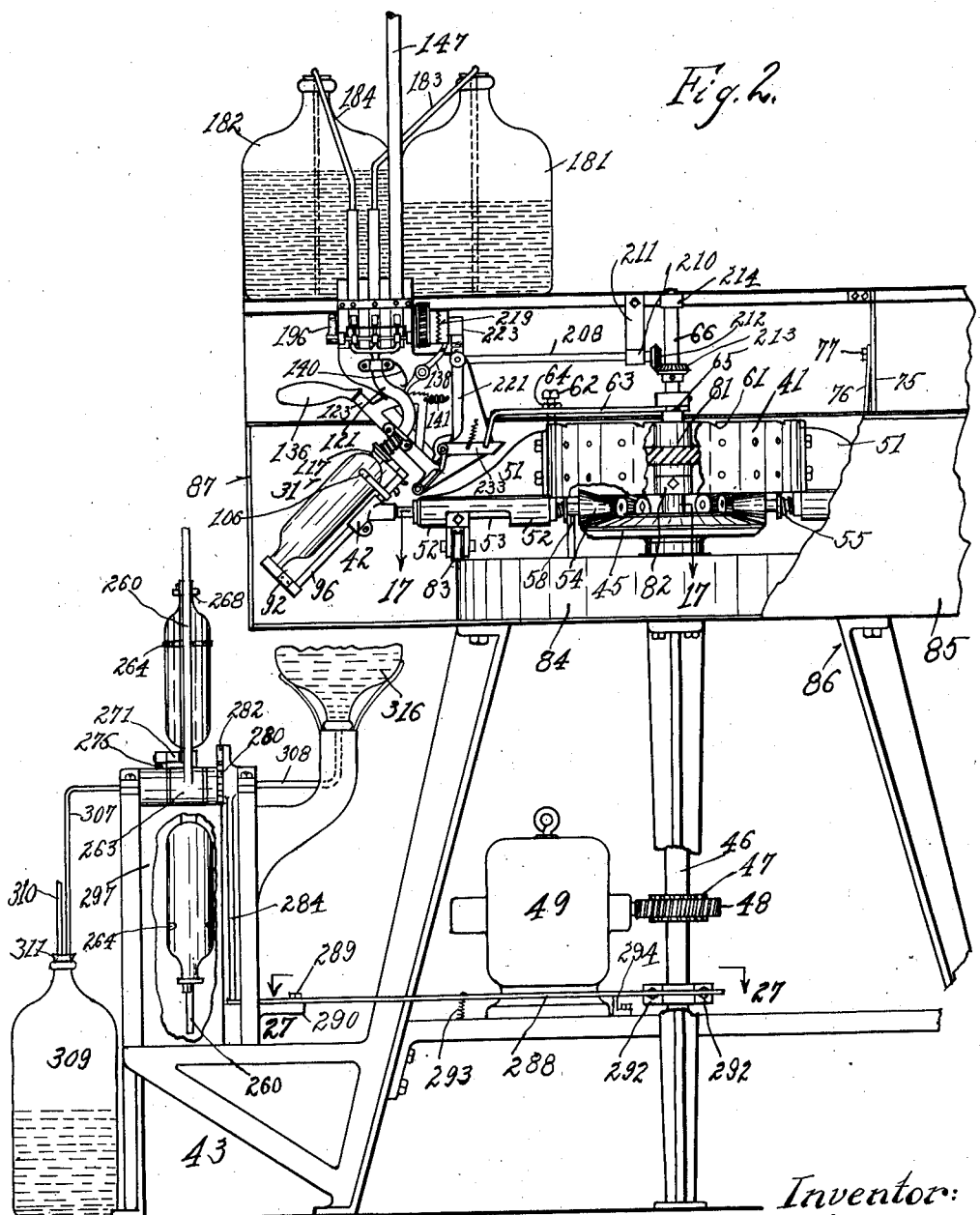
Fig. 2 is a side elevation of the same, the casing being partly broken away for exposing the interior thereof.

Fig. 27 is a plan view section of the means for operating the rinsing mechanism, taken on the line 27—27 of Fig. 2.

The bottle, the wall of which is instanced to be coated, is a glass bottle 31, (see Figs. 10 and 23), comprising an inner wall 32 and an outer wall 33, forming a space 34 between the walls, designed to be provided with a vacuum of suitable extent for heat-insulating the bottle. The walls are shown as connected at 35 at the mouth of the bottle for hermetically sealing the space at the mouth. The wall of the space is at a suitable point provided with a sealing teat, exemplified at 36, which during operations of my invention is unsealed, being provided with a passage 37 therethrough.

In the usual practice of making heat-insulated vessels of this character, the walls of the vessel, which are usually of glass, are preferably first formed up and connected for forming the heat-insulating space. The inner surfaces 38, 39, of the walls of said space are then provided with a coating, for instance of silvering compound, or a so-called mirror or silver surface, for the purpose of preventing or retarding transmission of certain of the heat rays through said space, after which the air in the space is exhausted to greater or less extent for providing said space with a vacuum of suitable degree, the sealing teat being then sealed for sealing the vacuum within the space.

The present invention is directed to the means and method for coating the wall of the vacuum space and for rinsing the coated surfaces and discharging the residue of the coating material and rinsing fluid, and preserving the valuable portions of the residue.

In carrying out my invention, I prefer to provide the space, the inner surfaces of the walls of which are to be coated, with a partial vacuum, inject the coating material into the partially vacuated space, subject the vessel to a movement which causes the coating material to be applied uniformly to the wall, draw off the residue of the coating material, and rinse the coated surface.

My invention contemplates a carrier 41 for the supports 42 of the vessels, the inner surfaces of the walls of which are to be coated, the carrier being exemplified as a rotatable carrier and the supports as rotatable supports, the vessels being so supported as to rotate them in such manner as to cause movement of the coating material about and lengthwise of the wall to be coated.

I have exemplified the means of rotation so arranged that rotation of the respective supports may be arrested while the vessels are removed from and applied to the respective supports at the operator's position 43, during which operation the rotation of the carrier is preferably also arrested, the rotation of the balance of the supports preferably continuing with an accelerated movement.

For accomplishing these objects I employ a prime moving gear 45, (see Figs. 1, 2, 17 and 18), exemplified as a bevel-friction gear, fixed to a shaft 46 rotated in suitable manner, as by means of a worm-wheel 47 fixed thereon, meshed by a worm 48 on the armature-shaft of a suitable electric motor 49.

The carrier has brackets 51 radiating therefrom, having bearings 52 thereon, in which shafts 53 are journaled. The respective shafts 53 have the supports 42 fixed thereon.

The shafts 53 have pinions 54 thereon, exemplified as friction-pinions, which coact with the prime moving gear 45 for rotating the pinions. The pinions are normally resiliently urged axially toward the gear 45 by springs 55, shown as surrounding the shafts 53, one end thereof abutting the bearing of the shaft, and the other end abutting the pinion, the pinion having slight axial movement on the shaft while rotatively fixed to the shaft by a pin 56 in the pinion passing through a slot 57 in the shaft. In order to release the pinion from operating coaction with the gear at the loading position of the support, the pinion is moved axially, accomplished by means of a cam 58 against which the outer wall of an annular groove 59 in the pinion is adapted to ride adjacent to the loading position, for moving the pinion axially.

Cessation of rotation of the carrier is accomplished by means of providing the carrier with a suitable number of stops, shown as the walls of recesses 61, into which the end of a coacting stop, shown as a bolt 62, is arranged to pass. The bolt is located on an arm 63 in which it is adjustable and held in adjusted positions by a jam-nut 64. The arm is pivoted at 65 about an upper extension 66 of the shaft 46, and is arranged to be moved up and down for causing coaction of the stop 62 with a selective one of the stops 61, for bringing the carrier to a position of rest at a point for causing positioning of the respective supports 42 at the loading position, and for release of said stops for again causing rotation of the carrier.

It is desirable that the stopping of rotation of the carrier shall be an easy stopping and not accompanied by jar, for accomplishing which a brake mechanism may, if it is found desirable, be employed. I have exemplified such brake mechanism, (see Figs. 3, 19, 20 and 21), as formed by a star-wheel 71 having blades 72 thereon, the advance edges of which are beveled, as shown at 73. The star-wheel is rotatable on a suitable bolt 74 suitably secured to a depending arm 75 depending from the upper part of the framework of the machine. A friction finger 76 coacts with the respective blades and is shown supported on the depending arm by means of a bolt 77, and resiliently urged toward the blades, which are arranged to pass between the finger and the depending arm. The resiliency and braking action of the finger may be adjusted by means of a spring 78 received about the adjusting bolt 79, the spring being located between the head of the bolt and the finger.

As the carrier rotates, the ribs 80 of the respective brackets thereon engage the blades for causing rotation of the star-wheel and passage of one of the blades with its reduced edge between the finger and depending arm, the frictional resistance increasing as the thicker portion of the blade is forced between the finger and depending arm for decreasing the speed of rotation of the carrier approximately at the point where the stop 61 is engaged by the stop 62 for bringing the carrier to a position of rest while avoiding jars of the carrier and the articles supported thereby.

Rotation of the gear 45 causes rotation of the pinions 54 for rotating the shafts 53 and the supports 42. The rotation of the gear also causes rotation of the carrier, the pinions moving planetwise about the gear. The springs 55 urge the pinions toward the gear 45, aiding in imparting the rotative movement to the carrier. The carrier rotates loosely about the shaft 46, it having a bearing 81 about the shaft, the carrier being supported with relation to the shaft by means of a collar 82 fixed to the shaft. The outer ends of alternate brackets 51 are preferably provided with rollers 83 which ride on a track 84 for aiding in the support of the carrier.

While the carrier is being rotated, part of the motion of the gear 45 is imparted to the pinions 54 for rotating the supports 42 and part of said motion is imparted to the carrier for rotating the carrier. When rotation of the carrier ceases, the entire motion of the gear 45 is imparted to the pinions 54 in operative contact therewith, thereby accelerating the speed of rotation of the supports 42 which remain in operative relation with the gear.

The supports preferably rotate and move annularly in a casing 85, exemplified as supported on a supporting frame 86, and as inclosing the bottle while being coated, the casing having an opening 87 through which the bottles are inserted and removed from the rotatable supports.

Figure 4:
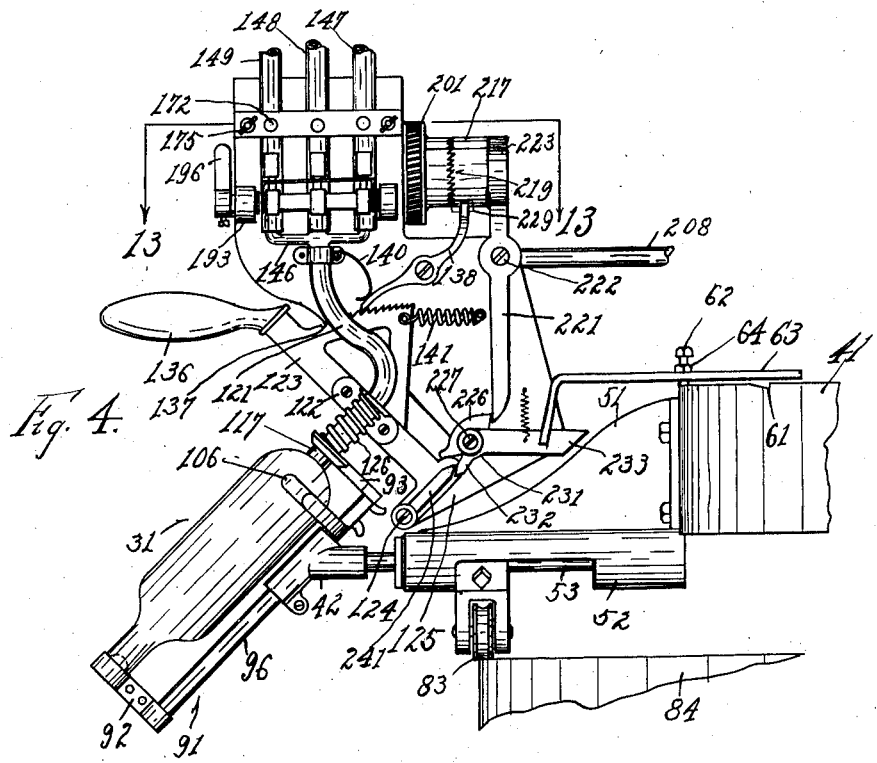
Fig. 4 is an enlarged detail in side elevation, illustrating the charging apparatus in charging relation.
Figure 5:
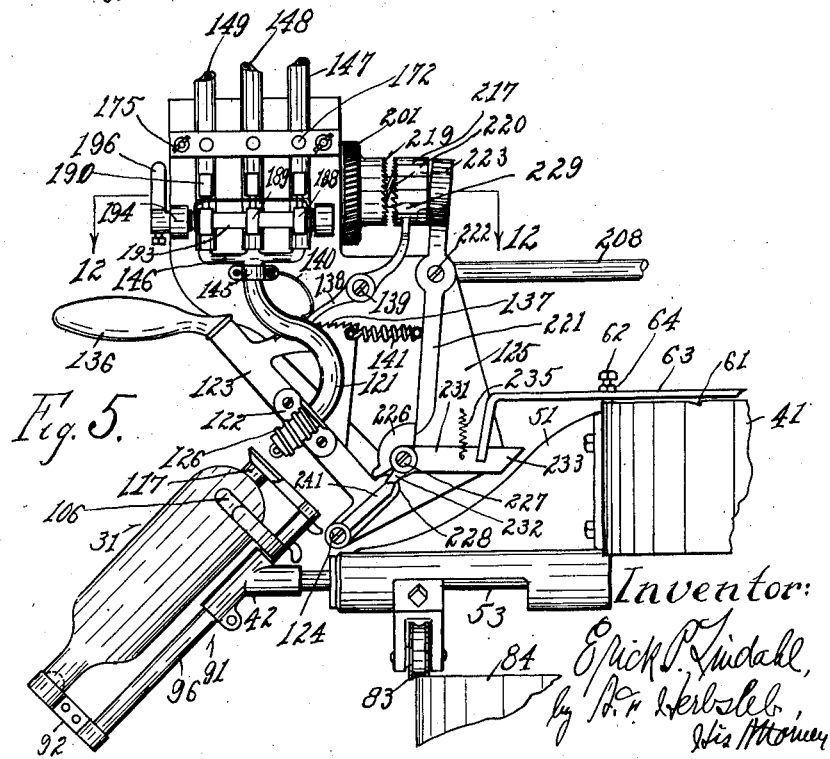
Fig. 5 is a similar view of the same, showing the same in released relation.

The respective supports are exemplified as a chuck 91, (see Figs. 4, 5, and 10), comprising an arm 92 and an arm 93 between which the bottle or vessel is arranged to be secured. The arm 92 comprises a positioning part 94 for the mouth of the bottle or container, this positioning part being preferably of a soft or yieldable material, for instance, rubber, to properly position and prevent injury to the bottle. The arm 93 is provided with a positioning part 95 arranged to coact with the positioning part 94. The positioning part 95 is also preferably a soft or yieldable material, for instance soft rubber, for forming a seal with the bottle.

Relative movement may be imparted to the arms for permitting insertion and removal of the bottles. Thus the arm 92 is exemplified as fixed to the relatively stationary hollow shank 96 of the support, which is arranged to be clamped in adjustable positions by a clamp-bearing 97, which is part of the support and is fixed to the shaft 53, this adjustment being provided for positioning the bottle axially with relation to the charging tube hereinafter described. The arm 93 is fixed to a relatively movable part 98 of the shank of the support. A spring 99 has one end thereof attached to the hollow shank-member 96, as by means of a screw 100 passing through a washer 101 and having the end of the spring wound about its inner end, the other end of the spring being secured, as by a pin 102, to the telescoping part 98 for urging approach between the arms. When it is desired to insert or remove the bottle, the arms are separated, which is exemplified as accomplished by providing the hollow shank with a finger 103, and the movable part 98 with a finger 104, the latter finger passing through a slot 105 in the hollow shank.

When pressure is exerted between the fingers as by means of the thumb and fore-finger of the hand of the operator, the arm 93 is moved away from the arm 92, so that the bottle can be inserted or removed, and when the fingers are released, the arm 93 approaches the arm 92 for clamping the bottle in place. For aiding in positioning the bottle, the support is preferably provided with guiding fingers 106, these fingers being preferably spring fingers for engaging the sides of the bottle and positioning the same.

When the bottle has been secured to the support, the space therein is charged with the coating material. The positioning part 95 is provided with a passage 111 which communicates with the passage 37 in the sealing teat. A valve 112 is located on the arm 93. This valve comprises a valve-seat 113 through which there is a passage 114. (See Figs. 10 and 11.) A disk 115 normally closes the seat and is resiliently held toward the seat, accomplished by means of a rubber band 116 stretched over the washer, the ends of the rubber band being clamped between the valve-seat 113 and the sleeve 117 in which the positioning part 95 is located.

A tube 121 communicates with the valve. (See Figs. 4, 5, 6, 7, 10 and 11). It is exemplified as a flexible hose, one end of which is secured by a clip 122 to a charging frame 123, exemplified as pivoted at 124 to a bracket 125 extending from the framework of the machine. The hose preferably is a rubber hose, its end being preferably wire bound, as shown at 126, for stiffening the same.

The hose is provided with a nozzle 130, (see Figs. 10 and 11), exemplified as having side apertures 131. The nozzle is arranged to be moved toward and from the valve 112 by manipulation of the charging frame. When moved toward the valve, the nozzle is arranged to move the valve-disk 115 off its seat, so that a passage is provided through the nozzle about the side edges of the valve-disk and thence through the passages 111 and 37 into the space between the walls of the bottle. The end edges 132 of the hose are arranged to seat upon the valve-seat.

The charging frame is provided with a handle 136. It also has thereon a rack 137 with which a pawl 138 pivoted to the bracket at 139 and urged toward the rack by a spring 140, is arranged to engage for maintaining the movable frame in moved position and maintaining connection between the hose and valve. A spring 141 normally retracts the movable frame. The tube 121 is attached to the bracket by means of a clip 145. It has connection with a manifold 146 having the tube branches with which flexible tubes 147, 148, 149, are connected, the latter having passages 150, 151, 152 therein. (See Figs. 13 and 14). The manifold is secured to the bracket by the clip 145.

The tube 147 leads to a suitable pumping or other device for creating a rarefaction of air or vacuum for temporarily creating a partial vacuum in the space 34 when the tube 121 has connection with the valve 112. The coating material replaces air drawn from said space, the partial vacuum in the space acting as a suction medium for drawing the coating material into said space, the communication with the suction or vacuum creating device having preferably been severed.

This severing is preferably accomplished by closing the passage 150 in the tube 147 for instance by means of a presser 153. Pressers 154, 155, coact respectively with the tubes 148, 149. The pressers are independently pivoted on a rod 156, located in bearings 157 of the bracket and secured in place by a pin 158. Cams 159, 160, 161, operate the respective pressers. The cam-face of each cam has a roller 162 on its presser coacting therewith. Each of the cams is preferably a two-part cam, comprising the members 163, 164, each of which has a part of the actuating face of the cam thereon in order to lengthen or shorten the time of pressing action of the presser. (See Figs. 13, 14 and 15). The cam-members are received about a shaft 165, the cam-member 164 being preferably adjustably secured to the shaft as by a set-bolt 166. The cam-member 163 is provided with a slot 167 through which a clamp-screw 168 is received into a threaded aperture in the cam-member 164. When the cam-member 164 has been set with relation to the cam-member 163, for providing the proper length of time of pressing action of the presser, the clamp-screw is tightened for maintaining the parts in adjusted relation.

The sizes of the passages 150, 151, 152, may also be regulated, as by adjustable shoes 171, respectively positioned by thumb-screws 172 having threaded adjustment in a bar 173 spaced from the wall of the supporting bracket by spacing blocks 174, the bar being releasably secured to the spacing blocks as by thumb-nuts 175. The shoes are supported by pins 176 slidable in apertures 177 in the bar. The pressing parts of the fingers are received through openings 178 in the wall of the bracket. The tubes 147, 148, 149, are preferably rubber hoses of suitable compressible nature.

The tubes 148, 149, respectively communicate with suitable receptacles 181, 182. (See Figs. 1, 2 and 3). Siphon tubes 183, 184, preferably of glass, lead from the respective receptacles 181, 182, and have the tubes 151, 152, respectively, received over their outer ends.

In the present exemplification of my invention the receptacle 181 contains a suitable silvering solution, preferably in fluid form. The receptacle 182 contains a suitable reagent, also preferably in fluid form, which acts on the silvering solution to precipitate the silver therein upon the inner surfaces of the walls of the space 34.

In explaining the operation of this part of the mechanism, it will be assumed that the bottle has been located in the support at the operator's position, and that the charging frame 123 has been actuated to cause communication between the flexible tube 121 and the valve 112. The movement of the charging frame into such charging position causes rotation of the shaft 165, (see Figs. 12, 13, 14 and 16), in manner to be presently described, the rotation of the shaft in the direction of the arrow in Fig. 16, causing the dropping of the roller 162 off the high portion of the cam with a quick releasing movement by the comparatively abrupt depression shown in the cam, the resilient nature of the tube normally urging recession of the presser. The opening of the passage 150 is thereby caused, resulting in suction through the tube 147 upon the air in the bottle for drawing air from the said space. When the air has been thus rarefied or a partial vacuum formed, the presser 153 again closes the passage 150.

The continued rotation of the shaft 165 causes the releasing portions of the cams 160, 161, to reach the rollers of the pressers 154, 155, the presser 154 being preferably released and again retracted for opening and closing the passage 151 before the release and subsequent retraction of the presser 155. When the pressure of the presser 154 is relieved for opening the passage 151 of the flexible tube 148, a charge of the silvering solution will pass the presser-position, the partial vacuum in the space 34 aiding the movement of the silvering solution into the space. The presser 154 is preferably returned to pressing position. The action of the presser 154 is followed by the relief of the presser 155 upon the flexible tube 149 for opening the passage 152 for introducing a portion of the reagent into said space 34 for coaction with the silvering solution. As soon as the proper amount of silvering solution and reagent have respectively passed the positions of the pressers, the respective pressers will again be moved into pressing relation by the cams coacting therewith. The flow of air and the flow of silvering solution and reagent may each be regulated by the adjustment of the thumb-screws 172, so that the quantities and proportions of the ingredients of the coating compound may be regulated with exactness, thereby obtaining best results and saving in materials.

In order to cause any portion of the silvering solution or reagent which may be in the tubes below the positions of the pressers, to be received within the space 34, means are provided for opening the passages in said tubes at a point below said presser positions, (see Figs. 4, 5, 12 and 14), exemplified by the openings 185, 186, 187. Valves 188, 189, 190, coact with said openings. Each of these valves is exemplified as a rubber band 191 received about curved presser fingers 192, the concave faces of said fingers being presented toward the tubes, the fingers being moved toward and from the tubes for closing or opening said openings, and the rubber bands acting as flexible and yieldable followers for securely closing said openings by simple means which are readily renewable.

I prefer that the walls of all the passages and valves shall be of rubber or glass, as I have found that these materials are least detrimentally affected by the silvering solution and reagent, and the parts are so arranged that the tubes and valve-parts are readily renewable.

The fingers 192 are secured to a rock-shaft 193 journaled in bearings located in lugs 194 extending from the bracket, springs 195 normally closing the valves. An arm 196 is fixed to the rock-shaft. (See Figs. 4, 5, 6, 7, 12 and 13.) An actuating arm 197 is fixed to the shaft 165 in such relation as to contact the arm 196 at the proper point in the revolution of the shaft 165, to open said valves 185, 186, 187, after the partial vacuum has been created in the space 34 and the charges of coating ingredients have passed the positions of the pressers 153, 154, 155, and the pressers have been retracted for closing the passages 150, 151, 152. The opening of the valves 185, 186, 187 causes any of the coating material in the tubes below said valves to pass into the space 34 and release any vacuum there may still be remaining in said space.

Actuation of the shaft 165 is instanced as caused by the following means, namely: A worm-wheel 201 is rotatable normally loosely about said shaft. It is actuated by a worm 202 on a shaft 203, (see Figs. 12, 13 and 16). The shaft 203 is journaled in bearings 204 of the wall 205 of the bracket 125 and has a bevel-gear 206 secured thereto. A bevel-pinion 207 is fast on a shaft 208, (see Figs. 1, 2 and 3), journaled in a bearing 209 on a bracket and in a bearing 210 of a hanger 211 depending from the framework of the casing. A bevel-gear 212 is fixed to the shaft 208 and is meshed by a bevel-gear 213 fixed to the upward extension 66 of the drive-shaft 46. The upward extension of this drive-shaft is journaled in a bearing 214 fixed to the framework of the casing.

A clutch-collar 217 has longitudinal movement on the shaft 165 and has rotative connection therewith, as by means of the pin and groove connection 218. The hub of the worm-wheel and the collar respectively have the coacting faces of a clutch 219, shown as a toothed clutch, between them. A spring 220 normally separates the clutch-members.

When the charging frame 123 is moved to cause engagement between the tube 121 and the valve 112, the clutch 219 is moved into operative relation for rotating the cam-shaft 165, accomplished in the present instance, (see Figs. 2, 4 and 5), by providing a lever 221 pivoted at 222 to the bracket. The lever has an engaging part 223 for engaging the collar 217, pushing the collar endwise for engaging the clutch. A lever 226 is pivoted to the bracket on a bolt 227, (see also Figs. 8 and 9), and is arranged to move the lever 221 for causing engagement of the clutch. The charging frame 123 is provided with an engaging face 228 shown as an arc-face arranged to engage the other end of the lever 226 for moving the same and causing movement of the lever 221 for engagement of the clutch when the charging frame is moved into operative relation to the bottle-support.

When the cam-shaft 165 has rotated for actuating the pressers and various parts designed for it to actuate, the pawl 138, which maintains the charging frame in operative position, is tripped for releasing the charging frame and withdrawing it to idle relation. The tripping of the pawl is instanced as accomplished by means of providing the collar 217 with a cam-face 229, (see Fig. 16), which is arranged to engage the end of the lever forming the pawl 138 for tripping the pawl.

A lever 231 is pivoted about the bolt 227 and comprises a heel 232 and an arm 233. The arm 233 is received in a slot 234 in a depending portion of the arm 63, for positioning said latter arm radially with relation to the carrier 41, and for causing raising and lowering of said arm 63 for release of the stop 62, or coaction of said stop with the stops 61 on said carrier. The arm 233 is maintained in said slot by a spring 235.

The charging frame is provided with a tripping lug 241 having the tripping faces 242, 243. (See Figs. 4, 5, 8 and 9). When the charging frame is moved into charging relation, (see Fig. 5), the tripping face 242 contacts the heel 232 for idly moving said lever and moving said tripping face past said heel. When the charging operation of the bottle has been completed and the pawl 138 is released for withdrawing the charging frame into inactive position, the tripping face 243, (see Figs. 9 and 4), will engage the heel 232 for raising the arms 233 and 63, and disengaging the stop 62 from the stop 61, for again causing rotation of the carrier and causing the charged bottle to proceed in its path about the carrier and through the casing 85. When the arm has been tripped and the carrier thus released, the further movement of the charging frame into inactive relation will cause the tripping lug 241 to repass the heel 232 for reëstablishing the relation shown in Fig. 5.

My improved means and method enables the silvering to be applied to the surface to be coated in ordinary temperatures, but if desired, the bottles may be subjected to heat, preferably heated air, during their passage through the casing. For accomplishing this purpose I provide a heater 241, instanced as a gas heater, having a suitable mixing valve 242 for mixing the gas and air, and a proper regulating valve 243 for regulating the supply of gas. The heat is conveyed into the casing by means of a flue 244, the heat being in the form of heated air which acts on the bottles or vessels in the channel for supplying the proper amount of heat, for instance, during cold weather. Suitable numbers of heaters or flues may be used. By providing the character of heating medium mentioned, namely, heated air, I produce best results combined with cleanly operation.

During each cessation of rotation of the carrier, the rotation of the bottle-support continues, preferably with accelerated speed. The manner of mounting the bottles is such that the coating material in the space 34 is caused to pass about and between the walls and bottoms to be coated and lengthwise of said walls, in a serpentine course, for contacting and coating all parts of the inner surfaces of said walls and bottoms with a uniform coating. The bottles are instanced as mounted with their axes at an angle other than a right angle with relation to the axis of rotation of the shaft upon which the support for the bottle is mounted. The bottles thus have a combined rotary and end to end movement imparted thereto, partly illustrated by the various positions in which the bottles in Fig. 3 are shown, representing various positions which the supports and their bottles assume during the rotation of the shafts on which the supports are mounted.

The body of coating material in the bottle, when the latter has been charged, is exemplified at 246. When the bottle arrives at the operator's position after having been acted on by the coating material, the bottle is removed from the support and placed upon a rinsing means, the rinsing means being located on the main frame at the operator's position, preferably at the right-hand side thereof, so as to render transference of the bottle from the bottle-support 42 to the rinsing means convenient for the operator.

The rinsing means comprise a bottle conveyer, exemplified as a revolving support, on which the bottle is placed and the residue of the coating material withdrawn by suction for creating a rarefaction of air or partial vacuum in the space 34, whereupon a rinsing fluid is introduced into the space for rinsing the surfaces which have been coated, the rinsing fluid being then preferably partially withdrawn by suction for again creating rarefaction of the air in the space, whereupon the space is again connected with the atmosphere for agitating the remainder of the fluid in the space, which last two operations may be repeated one or more times, the residue of the fluid being then withdrawn by suction, and the rarefied air or partial vacuum in the space 34 being then again connected with the atmosphere for nullifying the vacuum and permitting ready removal of the bottle from the revolving support.

The bottle is also, during the cleansing operation of the inner surfaces of the walls of the space, preferably passed through a cleansing bath for cleansing the outside of the bottle.

My preferred form of rinsing means is exemplified in Figs. 1, 2, 3 and 22 to 26 inclusive. The revolving support is exemplified at 251, and is instanced as a valve-member 252. It is journaled about a valve-member 253 coacting therewith. The valve-member 252 is preferably of a material which slides readily on the valve-member 253, which latter is preferably of metal, for instance brass, and forms a close joint therewith for avoiding leakage when the passages in the valve-members are brought into registry. The valve-member 252 is preferably composed of rubber and comprises a seat 254 for the bottle, with which it forms a seal, the seat having a passage 255 therethrough communicating with the passages of the valve-member 253 when in registry therewith. The seat has a recess 256 for receiving the teat of the bottle.

The revolving support has an arm 260 extending therefrom. A pair of these arms and of the seats 254 and their attendant parts is shown, description of one sufficing for both. The revolving support preferably comprises a pair of metal flanges 261 clamped toward each other by tie-rods 262 for clamping the bases 263 of the arms 260 and the valve-member 252 between them so as to rotate together.

The arm 260 is provided with spring-fingers 264, between which the bottle is received for temporarily holding the bottle in place. A bottle-clamp 266 is adjustably pivoted in selective holes 265 for different sized bottles to the arm at 267 and has a bottle positioning-part 268 thereon, arranged to be normally pressed toward the bottle by a spring 269. The bottle is intended to be inserted or removed when in uppermost upright position. When the arm is in position for insertion or removal of the bottle, the positioning-part is preferably automatically raised position, accomplished by providing the arm with a lever 271 pivoted to the arm at 272, a link 273 being articulated with lever 271 and the bottle-clamp 266. One of the bearings 274 of the valve-member 253 is provided with a cam 275 arranged to be contacted by the lever 271 for moving the positioning-part away from the bottle, the lever 271 passing the cam upon slight movement of the revolving support for permitting the positioning-part to move toward the bottle and clamp the same in place. The positioning part may be in the form of a closure for the bottle and be of rubber or other yieldable material.

The means for rotating the revolving support are exemplified as a ratchet-wheel 280 fixed to the revolving support, as by screws 281, a pawl 282 coacting with the ratchet-wheel. The pawl is pivoted at 283 to a reciprocating lever 284, pivoted by a bearing 285 about one of the bearings 274 of the valve-member 253. The lever 284 is actuated by a bar 288 pivoted at 289 to a lug 290 extending from the frame of the machine, the bar 288 having articulation 291 with the lever 284. The shaft 46 is provided with cams 292 which move the proximate end of the bar 288 in one direction, the said end of the bar being moved in the opposite direction by a spring 293, the bar riding on a guide 294.

A trough 297 may be provided and have a suitable rinsing fluid therein for the outside of the bottles, the bottles passing through said rinsing fluid during part of their movement.

The valve-member 253 is provided with a pair of chambers 301, 302, having a wall 303 between them, the chamber 301 being a discharging chamber and the chamber 302 a charging chamber. Rotation of the valve-member 253 is prevented by being fixed to the bearings 274, as by set-screws 304. The chambers are respectively closed at their ends by stoppers 305, 306, having passages therein, in which the tubes 307, 308, are received. The tube 307 leads into a residue receptacle 309. A tube 310 is received in the receptacle 309, preferably terminating adjacent to the top thereof. These tubes pass through a stopper 311 in the receptacle for making the receptacle an air-tight receptacle. The tube 310 leads to a suitable suction apparatus or partial vacuum creating device for providing a continuous rarefaction of air or partial vacuum in the receptacle 309.

The tube 308 communicates with a receptacle 316 which is adapted to contain the rinsing fluid which may, for example, be distilled water, the rinsing fluid being preferably let into the chamber 302 by gravity.

Instancing the operation of the device, it will be assumed that the revolving support has rotation imparted thereto in the direction of the arrow c, in Fig. 24, and is in the position in which the upper bottle is received thereon. Adjacent to the top of the valve-member 253 there is a passage 318 communicating with the chamber 301, this passage having an elongation 319 in the direction of movement of the passage 255. By the time the passage 255 arrives at the passage 318 in the rotation of the valve-member 252, the clamp 266 will have been seated on the bottle for forming firm connection between the passage 37 in the teat thereof with the passage 255. When the passage 255 registers with the passage 318, the space 34 in the bottle will be subjected to the action of the suction apparatus or vacuum creator, communicating with the tube 307, for drawing the residue or refuse of the coating material, consisting of the portion of the silvering solution and reagent remaining after the walls of the space 34 shall have been coated or silvered, and at the same time creating a rarefaction of air or partial vacuum in the space 34. The elongation 319 permits this suction to continue during a substantial part of the rotation of the support.

The passage 255 will next arrive at a passage 321 in the valve-member 253, which communicates with the chamber 302 and has an elongation 322 extending in the direction of movement of the passage 255. When the passage 255 registers with the passage 321, the space 34 is provided with a charge of distilled water, preferably filling said space, in the exemplification induced by the gravity flow of the water and by the partial vacuum in the space 34.

The partial vacuum in the space 34 is in each instance provided for permitting the ready inflow of fluid into the space, so that the inflow can be rapid and almost instantaneous, and to avoid the necessity of the inflowing fluid first displacing air in the space. It makes the operation of the device extremely rapid.

The passage 255 next arrives at a passage 323 in the valve-member 253, which communicates with the chamber 301, part of the rinsing fluid in the space 34 being thereby discharged, induced by the partial vacuum in said chamber.

The passage 255 next arrives at a passage 324 in the valve-member 253, which communicates with the atmosphere. The partial vacuum created in the space 34 and which is present in the top of said space, causes a sudden influx of air at the passage 324 and creates pronounced agitation of the rinsing fluid and forceful projection thereof throughout said space for cleansing the walls thereof.

The passage 255 may be caused to register with one or more additional passages respectively communicating with the chamber 301 and the atmosphere, for alternately withdrawing additional refuse fluid and subjecting the remainder of the refuse to agitation, exemplified by the passages 325, 326, 327, 328, the passages 325, 327, communicating with the chamber 301, and the passages 326, 328, being in the valve-member 253 and communicating with the atmosphere. When the passage 255 arrives at the passage 329, all remainder of the refuse is drawn off.

The passage 255 next arrives at a passage 330 communicating with the atmosphere for admitting atmospheric pressure into the space for ready release of the bottle from the revolving support.

When the bottle arrives in substantially upright position, in the present exemplification, the lever 271 is tripped by the cam 275 for releasing the bottle-clamp, the bottle just operated on being removed by the operator and a new bottle placed prior to the reclamping of the bottle-clamp.

Summarizing the performance of the present exemplification of my invention, the air in the insulating space of the bottle is rarefied and a silvering solution introduced, the bottle being rotated while held at an inclination to its axis of rotation, which rotation may take place in the presence of heat.

The means exemplified consist of a rotating carrier 41, on which rotary supports 42 rotate, with the bottles secured to the respective supports in such manner that the axis of the bottle is at an inclination to its axis of rotation. (See Figs. 1, 2, 3 and 10). A common driving gear 45 rotates pinions 54 on the shafts of the respective supports. The carrier is brought to rest, when a bottle arrives at the operator's position 43, the pinion of the bottle-support at the operator's position being moved out of operative engagement with the driving gear 45 by the cam 58, (see Figs. 17, 18 and 18a), while the rotations of the remaining bottles are accelerated.

The space in the bottle which is surrounded by the walls to be coated is charged with the coating material at the operator's position. For effecting the charging, a vacuum is created in said space through a flexible tube 147, and a silvering solution and a reagent therefor are charged into the space to replace withdrawn air, the silvering solution passing through a flexible tube 148 and the reagent passing through a flexible tube 149. (See Figs. 4, 5, 12, 13 and 14). These various flexible tubes connect with the manifold 146, from which a tube 121 leads to a charging nozzle 130, which is arranged to connect with the charging valve 112 of the rotary bottle support, as each bottle support is brought to rest at the operator's position. (See Figs. 10 and 11). The extent of vacuum and the amount of silvering solution and reagent, as well as the timed relations of the creation of the vacuum and the supply of the silvering solution and reagent, are controlled by the pressers 153, 154, 155, moved by the adjustable cams 159, 160, 161, (see also Fig. 15), followed by the opening of the valves 188, 189, 190, (see Fig. 12), to permit ready flow into said space of the portions of the silvering solution and reagent remaining in the tubes after the closure of said tubes by said pressers and the relief of vacuum in said space.

When the bottle has been charged, the nozzle 130 is retracted, whereby the valve 112 is closed, and the carrier is released by release of the stop 62, whereby the carrier is permitted to rotate, and all the bottles thereon are moved in their planetary orbit and rotated until the next cessation of rotation of the carrier for the removal of one of the coated bottles and the insertion of a bottle to be coated.

The nozzle 130 is connected with the valve 112 on the rotary support for opening the latter, by rocking the charging frame 123 by means of the operating handle 136, the charging frame being held in operated position by the pawl 138. The rocking of the charging frame closes the clutch 219 for causing the operation of the pressers 153, 154, 155, and places the stop 62 in coacting position with one of the stops 61 on the rotary carrier for stopping rotation of the carrier. The clutch sleeve 217 has a cam-face 229 thereon, which trips the pawl 138, whereby a spring 141 rocks the charging frame 123 for retracting the tube 121 and nozzle 130, and releasing the stop 62 for the next intermittent rotation of the carrier.

The bottles are rotated and moved planetwise by the carrier through the casing 85 while being subjected to heat, as from the heaters 241, and while so moving planetwise and rotating, the coating material in the space 34 of the bottles is caused to pass about and between the walls and bottoms to be coated and lengthwise of said walls, in serpentine paths, for contacting and coating all parts of the inner surfaces of said walls and bottoms with a uniform coating. The bottles have a combined rotary and end to end movement imparted thereto, as partly illustrated by the various positions in which the bottles in Fig. 3 are shown.

The residue of the coating material is then withdrawn by suction, a rarefaction of air or vacuum being created in the space 34, which acts to draw rinsing fluid into said space for rinsing the surfaces which have been coated, the bottle being mounted on the revolving support 251. The rinsing fluid is then partially withdrawn by suction for again creating a rarefaction of air in said space, whereupon the space is again connected with the atmosphere for agitating the remainder of the fluid in the space, which last two operations may be repeated one or more times, and the residue of the fluid then withdrawn by suction, the rarefied air in the space 34 being then again connected with the atmosphere for nullifying the vacuum and permitting ready removal of the bottle from the bottle support. During this operation the bottle may also pass through a cleansing bath in the trough 297, for cleansing the outside of the bottle, as exemplified in Figs. 1 and 2, the valves for controlling the introduction of cleansing fluid and the creation of vacuum while cleansing the bottle, being exemplified in Figs. 22 to 26 inclusive.

My invention provides a rapid and effective means and method for coating an interior surface of a vessel, and is especially useful for providing the inner surface of the wall of the vacuum space of a vacuum receptacle with a mirror or silvering coating, for rinsing the coating, and for saving the residue after application of the coating. The residue is received in the residue receptacle, which is readily replaced when the same has been filled, and the valuable constituents of the residue may be afterward separated or precipitated for reuse of the same.

Figure 1:
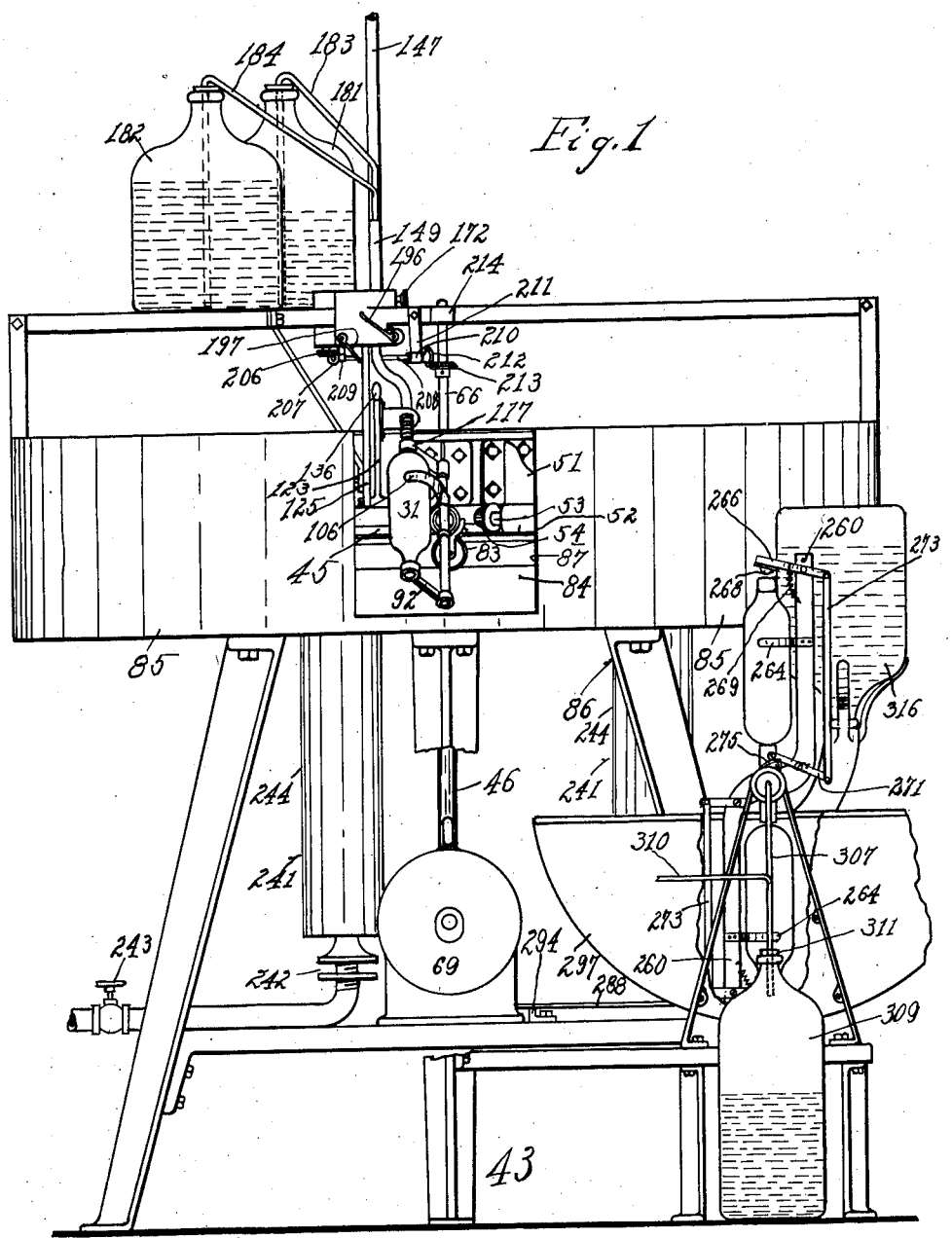
Figure 1 is a front elevation of an apparatus exemplifying my invention, partly broken away for better illustration of parts.

I preferably mount the bottle so that when its axis is in a vertical plane it is at one side of the axis of rotation of the shaft 53, as shown in the charging position in Figs. 1 and 3. So mounting the bottle aids in the intimate and uniform contact between the coating material and the surfaces being coated.

In order to hold the bottle in charging position when the pressure of the charging tube 121 is applied to the charging valve 112, a stop is shown in Fig. 18$^a$, in which the normal direction of rotation of the shaft 53 is indicated by the arrow $d$. The pressure applied by the charging tube is in the reverse direction, and is resisted by a pawl 60 pivoted to the cam 58 at 67, and arranged to engage the wall of a ratchet notch 68 in the wall of annular groove 59. A spring 69 normally urges the pawl against a pin 70, for placing the pawl in normal position of engagement when the movement of the carrier is stopped by the mechanism hereinbefore described. When movement of the carrier is resumed, the shaft 53 will again rotate in the direction of the arrow $d$, and the flange of the annular groove 59 will pass over the pawl, the latter yielding for the purpose.

Having thus fully described my invention, what I claim as new and desire to secure by Letters Patent, is:

1. The method of coating the inner surface of the wall of a substantially closed space in a vessel which consists in rarefying the air in said space, introducing a coating material in said space, and subjecting the vessel to rotative movements while holding said vessel at an inclination to its axis of rotation.

2. The method of coating the inner surface of the wall of an insulating space in a double-walled vessel, which consists in rarefying the air in said space, introducing a coating material in said space, and rotating the vessel while holding it at an inclination to its axis of rotation.

3. The method of coating the inner surface of the wall of a double-walled insulating space in a vessel, which consists in rarefying the air in said space, introducing a coating material in said space, rotating the vessel while holding it at an inclination to its axis of rotation, and subjecting the vessel to heat while rotating the same.

4. The method of coating the inner surface of the wall of an insulating space in a double-walled vessel, which consists in rarefying the air in said space through an opening in said wall, introducing a coating material into said space through said opening, and rotating the vessel while holding it at an inclination to its axis of rotation, whereby to move said coating material in reverse serpentine paths through said space.

5. The method of coating the inner surface of the wall of an insulating space in a double-walled vessel, which consists in rarefying the air in said space through an opening in said wall, introducing a coating material into said space through said opening, rotating the vessel while holding it at an inclination to its axis of rotation, whereby to move said coating material in reverse serpentine paths throughout said space, and removing residue of said coating material through said opening.

6. The method of coating the inner surface of the wall of an insulating space in a double-walled vessel, which consists in rarefying the air in said space through an opening in said wall, introducing a coating material into said space through said opening, rotating the vessel while holding it at an inclination to its axis of rotation, whereby to move said coating material in reverse serpentine paths throughout said space, removing residue of said coating material through said opening by suction, thereby forming a partial vacuum in said space, introducing cleansing fluid in said space, and alternately removing cleansing fluid by suction through said opening, thereby forming a partial vacuum in said space above said cleansing fluid, and causing injection through said cleansing fluid into said partial vacuum for agitating said cleansing fluid.

7. The method of coating the inner surface of the wall of a substantially closed space in a vessel, which consists in forming a partial vacuum in said space, introducing a coating material in said space, subjecting the vessel to rotative movements while holding the vessel at an inclination to its axis of rotation, and removing residue of said coating material from said space.

8. The method of coating the inner surface of the wall of a substantially closed space in a vessel, which consists in forming a partial vacuum in said space, introducing a coating material in said space, subjecting the vessel to rotatative movements while holding said vessel at an inclination to its axis of rotation, removing residue of said coating material from said space, and rinsing the coated surface of the wall of said space.

9. The method of coating the inner surface of the wall of a substantially closed space in a vessel, which consists in forming a partial vacuum in said space, introducing a coating material in said space, subjecting the vessel to rotative movements while holding said vessel at an inclination to its axis of rotation, simultaneously withdrawing residue of the coating solution and rarefying the air in said space, introducing a rinsing fluid into said rarefied air, and withdrawing said rinsing fluid.

10. The method of coating the inner surface of the wall of a substantially closed space in a vessel, which consists in forming a partial vacuum in said space, introducing a coating material in said space, subjecting the vessel to rotative movements while holding said vessel at an inclination to its axis of rotation, simultaneously withdrawing residue of the coating material and forming a partial vacuum in said space, introducing a rinsing fluid into said partial vacuum, partially withdrawing said rinsing fluid and simultaneously forming a partial vacuum in said space, injecting a fluid through said rinsing fluid into said partial vacuum, and withdrawing said rinsing fluid.

11. The method of silvering the inner surfaces of the inner and outer walls of a substantially closed space in a vessel to be vacuum-insulated, which consists in partially displacing the air in said space by a silvering compound introduced into said space, and subjecting the vessel to rotative movements while holding said vessel at an inclination to its axis of rotation.

12. The method of silvering the inner surfaces of the inner and outer walls of a substantially closed space in a vessel to be vacuum-insulated, which consists in partially displacing the air in said space by a silvering compound introduced into said space, rotating said vessel, removing residue of said compound from said space, and rinsing said inner surfaces of the inner and outer walls of said space.

13. The method of silvering the inner surfaces of the inner and outer walls of a substantially closed space in a vessel to be vacuum-insulated, which consists in partially displacing the air in said space by a silvering compound introduced into said space, rotating the vessel while holding it at an inclination to its axis of rotation, and subjecting the vessel to a current of heated air while rotating the same.

14. The method of silvering the inner surfaces of the inner and outer walls of a substantially closed space in a vessel to be vacuum-insulated, which consists in partially displacing the air in said space by a silvering compound introduced into said space, rotating the vessel while holding it at an inclination to its axis of rotation, subjecting the vessel to a current of heated air while rotating the same, removing residue of said compound from said space, introducing a rinsing fluid into said space and rinsing said inner surfaces, and removing said rinsing fluid.

15. In a coating machine, the combination of a carrier, vessel-supports mounted on said carrier, means for rotating said vessel-supports, and vessel-holding means on said supports holding each of said vessels at an inclination to the axis of rotation of its support.

16. In a coating machine, the combination of a carrier, vessel-supports mounted on said carrier, means for rotating said vessel-supports, and vessel-holding means on said supports holding said respective vessels at an inclination to the axis of rotation of the support of the vessel.

17. In a coating machine, the combination of a carrier, vessel-supports mounted on said carrier, means for charging vessels with a coating material, means for rotating said vessel-supports, vessel-holding means on said supports holding said respective vessels at an inclination to the axis of rotation of the support of the vessel, and means for automatically withdrawing residue of said coating material.

18. In a coating machine, the combination of a carrier, vessel-supports mounted on said carrier, means for charging vessels with a coating material, means for rotating said vessel-supports, vessel-holding means on said supports holding said respective vessels at an inclination to the axis of rotation of the support of the vessel, means for automatically withdrawing residue of said coating material, and means for automatically rinsing the coated surfaces of said vessels.

19. In a coating machine for coating the inner surfaces of the walls of the insulating space of double-walled vessels, the combination of a carrier, vessel-supports on said carrier, means for rotating said supports on said carrier, and vessel-holding means on said supports holding the vessels thereon respectively at an inclination to their axes of rotation for causing the coating material in said insulating space to move in reverse serpentine paths throughout said space.

20. In a coating machine for coating the inner surfaces of the walls of the insulating space of double-walled vessels, the combination of a casing, a carrier, vessel-supports on said carrier, means for rotating said supports on said carrier, vessel-holding means on said supports holding the vessels thereon respectively at an inclination to their axes of rotation for causing the coating material in said insulating space to move in reverse serpentine paths throughout said space, and means for moving said carrier with said vessel-supports traveling in said casing.

21. In a coating machine for coating the inner surfaces of the walls of the insulating space of double-walled vessels, the combination of a casing, a carrier, vessel-supports on said carrier, means for rotating said supports on said carrier, vessel-holding means on said supports holding the vessels thereon respectively at an inclination to their axes of rotation for causing the coating material in said insulating space to move in reverse serpentine paths throughout said space, means for moving said carrier with said vessel-supports traveling in said casing, and means for heating said casing.

22. In a coating machine, the combination of a casing, a rotary carrier, vessel-supports rotatably mounted thereon and having traveling movement in said casing, heating means for said casing, and means for rotating said carrier whereby to cause said traveling movement and for rotating said supports with relation to said carrier comprising a driving gear and planetary gearing having rotative connection with said supports.

23. In a coating machine, the combination of a rotary carrier, vessel-supports rotatably mounted thereon, means for rotating said carrier and for rotating said supports with relation to said carrier comprising a driving gear and planetary gears having rotative connection with said supports, means for resiliently moving said planetary gears toward said driving gear means for moving a planetary gear out of operative relation with said driving gear, and means for concurrently stopping rotation of said carrier, whereby rotations of the remainder of said planetary gears are accelerated.

24. In a coating machine, the combination of a rotary carrier, vessel-supports rotatably mounted thereon, means for rotating said carrier and supports comprising a driving gear and planetary gearing having rotative connection with said supports, means for interrupting rotation of said carrier, and means for interrupting rotation of a selective support while continuing rotations of the others of said supports for accelerating said last-named rotations.

25. In a coating machine, the combination of a carrier, vessel-supports thereon, means for rotating said vessel-supports on said carrier, vessel-holding means on said supports holding said vessels with their longitudinal axes at an inclination to the axes of rotation of the supports, respectively, charging means for said vessels, and means for causing coaction between said charging means and said respective vessels and release of said coaction.

26. In a coating machine of the character described, the combination of a carrier, means for moving said carrier, vessel-supports mounted on said carrier, vessel-holding means on said supports holding the vessels with their longitudinal axes at an inclination to the axes of rotation of said holders, respectively, means for rotating said supports, means for charging said vessels with coating material, means for automatically withdrawing residue of said coating material, and automatic rinsing means for said vessel.

27. In a coating machine of the character described, the combination of a casing, vessel-supports supporting vessels with their longitudinal axes at inclinations to their respective axes of rotation, and means for causing travel of said supports in said casing and rotation of said supports, during said travel.

28. In a coating machine of the character described, the combination of a casing, vessel-supports supporting vessels with their longitudinal axes at inclinations to their respective axes of rotation, means for causing travel of said supports in said casing and rotation of said supports during said travel, said casing having an opening, and means for causing arrest of said travel of said supports respectively at said opening and arrest of rotation of said support at said opening and accelerated rotation of the balance of said supports.

29. In a coating machine of the character described, the combination of a casing, vessel-supports supporting vessels with their longitudinal axes at inclinations to their respective axes of rotation, means for causing travel of said supports in said casing and rotation of said supports during said travel, and means for subjecting said vessels to heated air during said travel.

30. In a coating machine of the character described, the combination of a casing, a rotary carrier, vessel-supports on said carrier supporting vessels with their respective longitudinal axes at an inclination to their axis of rotation, charging means for charging /said vessels with coating compound, means for releasing said vessels from said charging means, means for rotating said carrier and said supports with relation to said carrier, and means for releasing said vessels from said supports.

31. In a coating machine of the character described, the combination of a casing, a rotary carrier, vessel-supports on said carrier supporting vessels with their respective longitudinal axes at an inclination to their axis of rotation, charging means for charging said vessels with coating compound, means for releasing said vessels from said charging means, means for rotating said carrier and said supports with relation to said carrier, means for withdrawing residue of said coating compound, and means for rinsing the coated surfaces.

32. In a coating machine for coating the inner surfaces of the walls of the insulating space of double-walled vessels, the combination of a casing, a rotary carrier, vessel-supports on said carrier supporting said vessels with their respective longitudinal axes at an inclination to their axis of rotation, charging means for charging said space with coating compound, means for releasing said vessels from said charging means, means for rotating said carrier and said supports, suction means withdrawing residue of coating material and creating partial vacuum in said space, means for injecting rinsing fluid in the partially evacuated space, means for withdrawing rinsing fluid and forming partial vacuum in said space, means for causing injection into the partial vacuum thus formed through the rinsing fluid, and means for withdrawing the rinsing fluid.

33. In a coating machine of the character described, the combination of a carrier, vessel-supports on said carrier, means for rotating said carrier, means for rotating said vessel-supports on said carrier, charging means for the vessels, means for connecting said charging means to said vessels, said charging means comprising means for forming partial vacuum in the space in said vessel, means for introducing coating material into the partially evacuated space, and means for releasing said charging means from said vessel.

34. In a coating machine for the insulating space of vessels of the character described, the combination of charging means comprising a vacuum-tube, a coating-solution tube, and a reagent tube, a valve for each of said tubes, means for operating said valves, a vessel-support, a movable part connecting said charging means with said vessel, said movable part having connection with said operating means for causing operative relation therein, and a releasing part, said operating means comprising a part coacting with said releasing part for releasing said movable part from said vessel.

35. In a coating machine for the insulating space of vessels of the character described, the combination of charging means comprising a vacuum-tube, a coating-solution tube, and a reagent tube, a valve for each of said tubes, means for operating said valves for said vacuum-tube, said coating-solution tube and said reagent tube consecutively in the order named, a vessel-support, a movable part connecting said charging means with said vessel, said movable part having connection with said operating means for causing operative relation therein, and a releasing part, said operating means comprising a part coacting with said releasing part for releasing said movable part from said vessel.

36. In a coating machine for the insulating space of vessels of the character described, the combination of charging means comprising a vacuum-tube, a coating-solution tube, and a reagent tube, a valve for each of said tubes, means for operating said valves for said vacuum-tube, said coating-solution tube and said reagent tube consecutively in the order named, a vessel-support, a movable part connecting said charging means with said vessel, said movable part having connection with said operating means for causing operative relation therein, a releasing part, said operating means comprising a part coacting with said releasing part for releasing said movable part from said vessel-support, clearing valves for said respective tubes between said first-named valves and the connection of said charging means with said vessel, and means for operating said last-named valves having timed connection with said operating means for said first-named valves.

37. In a coating machine, the combination of a rotary carrier, vessel-supports thereon, means for rotating said rotary carrier, means for rotating said vessel-supports with relation to said carrier, charging means for the vessels on said supports, means for connecting said charging means with said vessels on said supports, and means for interrupting the rotation of said carrier, said last-named means having operative connection with said charging means for being operated thereby.

38. In a coating machine, the combination of a casing, a carrier moving therein, vessel-supports mounted on said carrier, means for charging vessels with coating material, means for rotating said vessel-supports and moving said carrier for causing carrying movement of said rotating vessels in said casing, vessel-holding means on said supports holding said respective vessels at an inclination to the axis of rotation of the support of the vessel, and means for heating the air in said casing for causing travel of said vessels through heated air.

39. In a coating machine, the combination of a casing, a carrier moving therein, vessel-supports mounted on said carrier, means for charging vessels with coating material, means for rotating said vessel-supports and moving said carrier for causing carrying movement of said rotary vessels in said casing, vessel-holding means on said supports holding said respective vessels at an inclination to the axis of rotation of the support of the vessel, means for heating the air in said casing for causing travel of said vessels through heated air, and means for automatically withdrawing residue of said coating material from said vessels.

40. In a coating machine, the combination of a casing, a carrier moving therein, vessel-supports mounted on said carrier, means for charging vessels with coating material, means for rotating said vessel-supports and moving said carrier for causing carrying movement of said rotary vessels in said casing, vessel-holding means on said supports holding said respective vessels at an inclination to the axis of rotation of the support of the vessel, means for heating the air in said casing for causing travel of said vessels through heated air, means for automatically withdrawing residue of said coating material from said vessels, and means for automatically rinsing the coated surfaces of said vessels.

41. In a coating machine of the character described, the combination of a carrier, means for moving said carrier, a vessel-support, means for rotating said vessel-support on said carrier, a charging means for the vessel on said support comprising a movable charging part arranged for movement toward said vessel for coaction therewith, said charging means comprising controlling means for the coating material, means between said charging part and controlling means for causing operative connection in said controlling means for operating the same, and carriage stopping means having operative connection with said charging part.

42. In a coating machine of the character described, the combination of a carrier, means for moving said carrier, a vessel-support, means for rotating said vessel-support on said carrier, a charging means for the vessel on said support comprising a movable charging part arranged for movement toward said vessel for co-action therewith, said charging means comprising controlling means for the coating material, means between said charging part and controlling means for causing operative connection in said controlling means for operating the same, carriage stopping means having operative connection with said charging part, and means between said controlling means and said charging part automatically releasing said charging part for movement thereof away from said support.

43. In a coating machine of the character described, the combination of a carrier, rotatable supports thereon, means for moving said carrier, means for rotating said supports on said carrier, charging means for the vessels on said supports comprising flexible tubes having passages therethrough; means for compressing said tubes comprising pressers, cams for said pressers and rotating means for said cams; a movable charging part having operative connection with said flexible tubes for coaction of said tubes with the vessels on said supports, and a connecting part having operative connection with said charging part and with said rotating means for controlling said rotating means.

44. In a coating machine of the character described, the combination of a carrier, rotatable supports thereon, means for moving said carrier, means for rotating said supports on said carrier, charging means for the vessels on said supports comprising flexible tubes having passages therethrough; means for compressing said tubes comprising pressers, cams for said pressers and rotating means for said cams; a movable charging part having operative connection with said flexible tubes for coaction of said tubes with the vessels on said supports, and a connecting part having operative connection with said charging part and with said rotating means for controlling said rotating means, said rotating means comprising a trip for releasing said last-named connection.

45. In a coating machine of the character described, the combination of a carrier, rotatable supports thereon, means for moving said carrier, means for rotating said supports on said carrier, charging means for the vessels on said supports comprising flexible tubes having passages therethrough; means for compressing said tubes comprising pressers, cams for said pressers and rotating means for said cams, a charging part having operative connection with said flexible tubes for coaction with the vessels on said supports, and a connecting part having operative connection with said charging part and with said rotating means for controlling said rotating means, relief valves for said tubes, and operating means for said relief valves moved by said rotating means.

46. In a coating machine of the character described, the combination of a carrier, vessel-supports rotatively mounted on said carrier, charging means for the vessels comprising a pivoted charging part, charging valves, driving means therefor, a lever for controlling said driving means, means for causing movement of said carrier, a stop for said carrier, and a lever for said stop, said pivoted charging part having parts thereon for moving said levers and thereby controlling operation of said valves and said stop.

47. In a coating machine of the character described, the combination of a carrier, vessel-supports rotatively mounted on said carrier, charging means for the vessels comprising a pivoted charging part, charging valves, driving means therefor, a lever for controlling said driving means, means for causing movement of said carrier, a stop for said carrier, a lever for said stop, said pivoted charging part having parts thereon for moving said levers and thereby controlling operation of said valves and said stop, and means for automatically retracting said pivoted charging part.

48. In a coating machine, the combination of a carrier, vessel-supports rotatably mounted thereon, charging means for the vessels, stopping means for the carrier, said charging means having operative connection with said stopping means for controlling the latter, and braking means for the carrier comprising a stationarily positioned star-wheel arranged to be moved by said carrier, and friction means with which said star-wheel coacts causing resistance to movement of said star-wheel acting on said carrier proximate to engagement of said stopping means with said carrier.

49. In a coating machine of the character described, the combination of a carrier, means for moving said carrier, vessel-supports rotatably mounted on said carrier, charging means for the vessels on said supports comprising flexible tubes, pressers coacting with said tubes for pressing said tubes and closing the feed-passages therein, and pluri-part cams for operating said fingers respectively having adjustment between their parts for adjusting the durations of pressing actions of said fingers.

50. In a coating machine of the character described, the combination of a carrier, means for moving said carrier, vessel-supports rotatably mounted on said carrier, charging means for the vessels on said supports comprising flexible tubes, pressers coacting with said tubes for pressing said tubes and closing the feed-passages therein, and pluri-part cams for operating said fingers respectively having adjustment between their parts for adjusting the durations of pressing actions of said fingers, said cams arranged for consecutively operating said fingers.

51. In a coating machine of the character described, the combination of a carrier, means for moving said carrier, vessel-supports rotatably mounted on said carrier, charging means for the vessels on said supports comprising flexible tubes, pressers coacting with said tubes for pressing said tubes and closing the feed-passages therein, pluri-part cams for operating said fingers respectively having adjustment between their parts for adjusting the durations of pressing actions of said fingers, and adjusting parts opposed to said fingers for regulating said passages.

52. In a coating machine of the character described, the combination of a carrier, means for moving said carrier, vessel-supports rotatably mounted on said carrier, charging means for the vessels on said supports comprising flexible tubes, pressers coacting with said tubes for pressing said tubes and closing the feed-passages therein, pluri-part cams for operating said fingers respectively having adjustment between their parts for adjusting the durations of pressing actions of said fingers, and relief valves for said tubes acting on said tubes at points lower than the points of operation of said pressers on said tubes, 53. In a coating machine of the character described, the combination of a carrier, vessel-supports rotatably mounted on said carrier, charging means for the vessels comprising compressible rubber hoses having passages therethrough, pressers acting on said hoses for controlling said passages, apertures in said rubber hoses communicating with said passages below the points of pressure thereon by said pressers, means for controlling said passages comprising rubber bands arranged to be pressed thereover, and means for operating said pressers and rubber bands.

54. In a coating machine of the character described, the combination of a rotary vessel-support comprising a clutch having arms between which said vessel is clamped, fingers having connection with said respective arms for separating said arms, and a spring for causing coaction between said arms, one of said arms having a passage therethrough communicating with the vessel clutched by said clutch, and a normally closed valve for said passage.

55. In a coating machine of the character described, the combination of a rotary vessel support comprising a clutch having arms between which said vessel is clamped, fingers having connection with said respective arms for separating said arms, and a spring for causing coaction between said arms, one of said arms having a passage therethrough communicating with the vessel clutched by said clutch, a normally closed valve for said passage, and charging means comprising a nozzle arranged for opening said valve when said charging means is in charging relation.

In testimony whereof, I have hereunto signed my name in the presence of two witnesses.

ERICK P. LINDAHL.

Witnesses:
THERESA M. SILBER,
CHARLES E. WEBER.